US011574458B2

(12) United States Patent
Horesh et al.

(10) Patent No.: US 11,574,458 B2
(45) Date of Patent: Feb. 7, 2023

(54) AUTOMATED SURVEY RESULTS GENERATION FROM AN IMAGE

(71) Applicant: International Business Machines Corporation, Armonk, NY (US)

(72) Inventors: Lior Horesh, North Salem, NY (US); Dario Gil, Katonah, NY (US); Marco Pistoia, Amawalk, NY (US); Anthony Annunziata, Stamford, CT (US); Richard Chen, Mount Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 58 days.

(21) Appl. No.: 16/238,084

(22) Filed: Jan. 2, 2019

(65) Prior Publication Data

US 2020/0210787 A1 Jul. 2, 2020

(51) Int. Cl.
*G06V 10/75* (2022.01)
*G06Q 30/02* (2012.01)
(Continued)

(52) U.S. Cl.
CPC ......... *G06V 10/75* (2022.01); *G06Q 30/0201* (2013.01); *G06T 1/0007* (2013.01);
(Continued)

(58) Field of Classification Search
None
See application file for complete search history.

(56) References Cited

U.S. PATENT DOCUMENTS

| 5,121,201 A * | 6/1992 | Seki | G07C 9/00 |
| | | | 348/143 |
| 6,467,089 B1 * | 10/2002 | Aust | H04H 60/37 |
| | | | 455/2.01 |

(Continued)

OTHER PUBLICATIONS

Sindagi et al., A survey of recent advances in CNN-based single image crowd counting and density estimation, Pattern Recognition Letters, vol. 107, May 1, 2018, pp. 3-16, (Year: 2018).*

(Continued)

*Primary Examiner* — Darlene Garcia-Guerra
(74) *Attorney, Agent, or Firm* — Amin, Turocy & Watson, LLP

(57) ABSTRACT

In one or more embodiments described herein, device, computer-implemented methods, and/or computer program products that facilitate automated survey results generation from an image are provided. According to an embodiment, a system can comprise a memory that stores computer executable components and a processor that executes the computer executable components stored in the memory. The computer executable components can comprise an image capturing component that captures a first sample image. The computer executable components can further comprise an image processing component that processes the first sample image to determine a survey count, wherein the survey count indicates a number of times a survey image was identified in the first sample image. The computer executable components can further comprise an authentication component that adjusts the survey count based on detection of a discrepancy.

20 Claims, 9 Drawing Sheets

(51) Int. Cl.
*G06T 7/00* (2017.01)
*G06T 1/00* (2006.01)
*G10L 15/08* (2006.01)

(52) U.S. Cl.
CPC .............. *G06T 7/97* (2017.01); *G10L 15/08* (2013.01); *G06T 2207/30242* (2013.01)

(56) References Cited

U.S. PATENT DOCUMENTS

| | | | | |
|---|---|---|---|---|
| 6,633,232 | B2* | 10/2003 | Trajkovic | G06Q 30/06 348/143 |
| 7,787,656 | B2 | 8/2010 | Chen | |
| 9,292,092 | B2 | 3/2016 | Yuxin et al. | |
| 9,769,420 | B1* | 9/2017 | Moses | G08B 25/10 |
| 2002/0073417 | A1* | 6/2002 | Kondo | H04N 21/439 725/10 |
| 2005/0091311 | A1* | 4/2005 | Lund | G08B 13/1968 709/203 |
| 2006/0062429 | A1* | 3/2006 | Ramaswamy | G06T 7/254 382/103 |
| 2007/0098253 | A1* | 5/2007 | Crespi | G06K 9/00778 382/159 |
| 2008/0008360 | A1* | 1/2008 | Pattikonda | G06K 9/00228 382/118 |
| 2009/0217315 | A1* | 8/2009 | Malik | H04N 7/181 725/9 |
| 2010/0153189 | A1* | 6/2010 | Dudley | H04N 21/25891 705/12 |
| 2010/0195865 | A1* | 8/2010 | Luff | H04H 60/33 382/100 |
| 2010/0207874 | A1* | 8/2010 | Yuxin | G09F 27/00 345/156 |
| 2011/0063440 | A1* | 3/2011 | Neustaedter | H04N 7/147 348/143 |
| 2012/0017231 | A1* | 1/2012 | Chao | G06Q 30/02 725/12 |
| 2012/0141969 | A1* | 6/2012 | Ohmae | G06Q 30/02 434/362 |
| 2012/0182384 | A1* | 7/2012 | Anderson | H04N 7/147 348/14.09 |
| 2012/0274775 | A1* | 11/2012 | Reiffel | G06Q 30/08 348/158 |
| 2012/0323590 | A1* | 12/2012 | Udani | G16H 10/20 705/2 |
| 2013/0018701 | A1* | 1/2013 | Dusig | G06Q 30/0203 705/7.32 |
| 2013/0089244 | A1* | 4/2013 | Acosta-Cazaubon | G06Q 30/0241 382/118 |
| 2013/0124207 | A1* | 5/2013 | Sarin | H04N 5/232 704/275 |
| 2013/0298146 | A1* | 11/2013 | Conrad | H04N 21/44213 725/12 |
| 2014/0038544 | A1* | 2/2014 | Jones | G08B 25/08 455/404.2 |
| 2014/0111597 | A1* | 4/2014 | Anderson | H04L 65/1073 348/14.03 |
| 2014/0150032 | A1* | 5/2014 | Pacor | H04N 21/41407 725/62 |
| 2014/0161305 | A1* | 6/2014 | Lee | G06F 3/0304 382/103 |
| 2014/0254876 | A1* | 9/2014 | Srinivasan | G06K 9/00295 382/103 |
| 2015/0016712 | A1* | 1/2015 | Rhoads | H04N 7/185 707/769 |
| 2015/0127340 | A1* | 5/2015 | Epshteyn | G10L 21/00 704/235 |
| 2015/0189378 | A1* | 7/2015 | Soundararajan | H04N 21/4126 725/12 |
| 2015/0331550 | A1* | 11/2015 | Wang | G06F 3/04842 715/771 |
| 2016/0007083 | A1* | 1/2016 | Gurha | H04N 21/252 725/13 |
| 2016/0019698 | A1 | 1/2016 | Kalva et al. | |
| 2016/0063516 | A1* | 3/2016 | Terrazas | G06K 9/00637 705/7.29 |
| 2016/0110613 | A1 | 4/2016 | Ghanem et al. | |
| 2016/0125242 | A1* | 5/2016 | Hawkins | A63F 11/00 382/103 |
| 2016/0255126 | A1* | 9/2016 | Sarris | H04N 7/155 348/14.08 |
| 2017/0188216 | A1* | 6/2017 | Koskas | G08B 25/016 |
| 2017/0223947 | A1* | 8/2017 | Gall | G01N 21/4738 |
| 2017/0255820 | A1* | 9/2017 | Liu | G06K 9/00677 |
| 2017/0330025 | A1* | 11/2017 | Ono | G06T 7/70 |

OTHER PUBLICATIONS

Datta, Ritendra, Jia Li, and James Z. Wang. "Algorithmic inferencing of aesthetics and emotion in natural images: An exposition." 2008 15th IEEE international conference on image processing. IEEE, 2008 (Year: 2008).*

A. B. Chan and N. Vasconcelos, "Counting People With Low-Level Features and Bayesian Regression," in IEEE Transactions on Image Processing, vol. 21, No. 4, pp. 2160-2177, Apr. 2012, doi: 10.1109/TIP.2011.2172800 (Year: 2012).*

S. H.Y., G. Shivakumar and H. S. Mohana, "Crowd Behavior Analysis: A Survey," 2017 International Conference on Recent Advances in Electronics and Communication Technology (ICRAECT), 2017, pp. 169-178, doi: 10.1109/ICRAECT.2017.66 (Year: 2017).*

Chiang et al., "Vision-based Raising Hand Detection in Classroom," IAPR International Conference on Machine Vision Applications, May 20-23, 2013, 4 pages.

Bo et al., "Detection of a Hand-Raising Gesture by Locating the Arm," Proceedings of the 2011 IEEE International Conference on Robotics and Biomimetics, Dec. 7-11, 2011, 5 pages.

Nazare et al., "Hand-raising gesture detection with Lienhart-Maydt method in videoconference and distance learning," Progress in Pattern Recognition, Image Analysis, Computer Vision, and Applications—18th Iberoamerican Congress, CIARP, Nov. 20-23, 2013, 8 pages.

* cited by examiner

AUTOMATED SURVEY RESULTS GENERATION FROM AN IMAGE

BACKGROUND

The subject disclosure relates generally to generating survey results, and more particularly, systems, computer-implemented methods, and computer program products that automatically generate survey results from an image.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate the automated survey results generation from an image.

According to an embodiment, a system can comprise a memory that stores computer executable components and a processor that executes the computer executable components stored in the memory. The computer executable components can comprise an image capturing component that captures a first sample image. The computer executable components can further comprise an image processing component that processes the first sample image to determine a survey count, wherein the survey count indicates a number of times a survey image was identified in the first sample image. The computer executable components can further comprise an authentication component that adjusts the survey count based on detection of a discrepancy.

According to another embodiment, a computer-implemented method can comprise capturing, by a device operatively coupled to a processor, a first sample image. The computer-implemented method can further comprise processing, by the device, the first sample image to determine a survey count, wherein the survey count indicates a number of times a survey image was identified in the first sample image. The computer-implemented method can further comprise adjusting, by the device, the survey count based on detection of a discrepancy.

According to another embodiment, a computer program product for automated generation of survey results from an image, the computer program product comprising a computer readable storage medium having program instructions embodied therewith, the program instructions executable by a processor to cause the processor to capture, by the processor, a first sample image; process, by the processor, the first sample image to determine a survey count, wherein the survey count comprises number of times a survey image was identified in the first sample image; and adjust, by the processor, the survey count based on detection of a discrepancy.

DETAILED DESCRIPTION

The following detailed description is merely illustrative and is not intended to limit embodiments and/or applications or uses of embodiments. Furthermore, there is no intention to be bound by any expressed or implied information presented in the preceding Summary section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

According to some embodiments, a system (discussed below in FIG. 3) is described herein that allows a lecturer/moderator to spontaneously conduct a survey (e.g., take a survey) and automatically attain survey results. For example, a moderator poses a survey question that asks the audience to raise hands to responds. In response, one or more member of the audience raises their hand. In some embodiments, an image of the audience is captured in response to the posed survey question and the image is processed to determined number (e.g., a survey count) of hands raised in response to the survey question. In some embodiment, additional characteristics associated with the raised hand can be identified to adjust the survey count.

Figure 1:
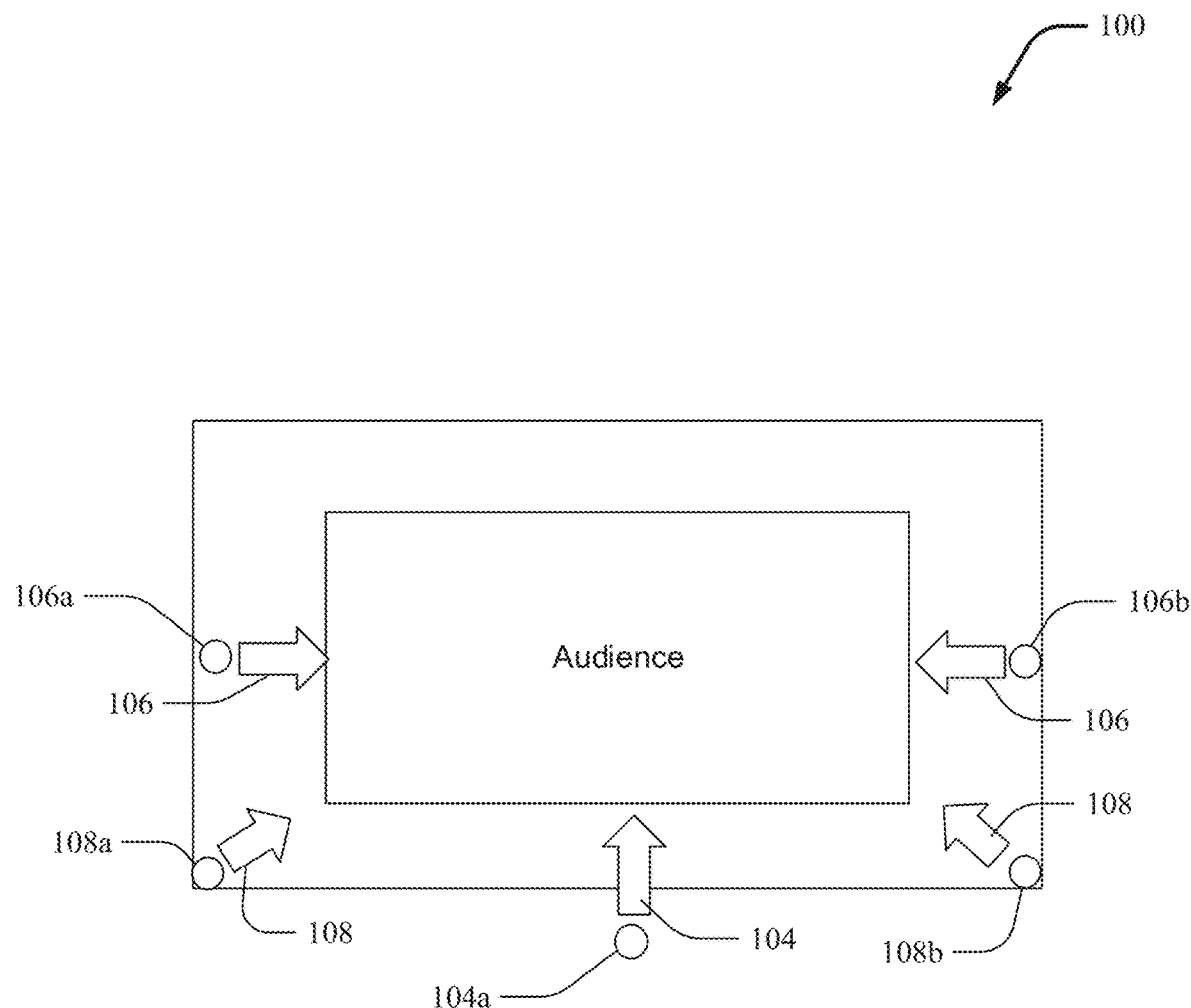
FIG. 1 illustrates an example of an auditorium wherein one or more viewpoints are employed to capture images of the audience in accordance with one or more embodiments described herein.

FIG. 1 illustrates an example of an auditorium 100 wherein one or more viewpoints are employed to capture images of the audience in accordance with one or more embodiments described herein. Repetitive description of like elements employed in respective embodiments is omitted for sake of brevity. According to some embodiments, a first sample image (discussed below) is captured using a camera (e.g., camera from a mobile device) of the moderator from a front view point (illustrated by the arrow 104) at location 104a (e.g., location of mobile device of the moderator). In some embodiments, additional cameras or mobile devices can be located at location 106a and 106b to acquire/capture images of side view point (illustrated by arrow 106) of the audience and at location 108a and 108b to acquire/capture images of corner view point (illustrated by arrow 108) of the audience.

Figure 2A:
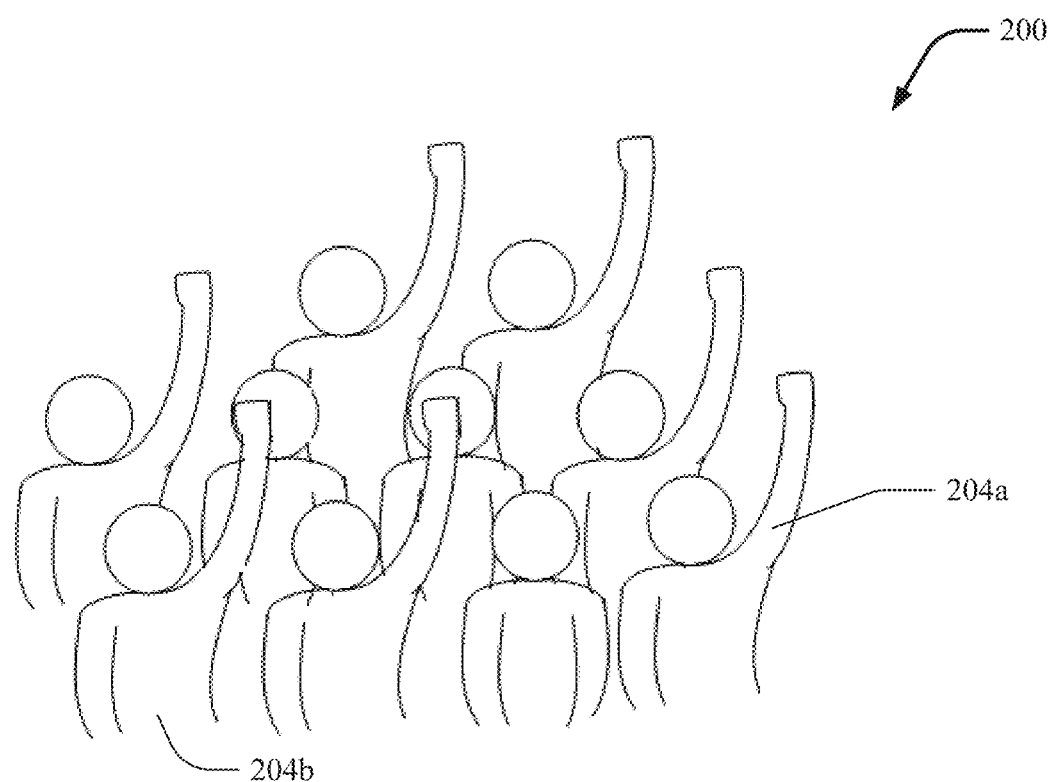
FIG. 2A illustrates an example, non-limiting an image captured from moderator's view point in accordance with one or more embodiments described herein.

FIG. 2A illustrates an example, non-limiting an image 200 captured from moderator's view point. Repetitive description of like elements employed in respective embodiments is omitted for sake of brevity. According to some embodiments, the image (e.g., first sample image) 200 can be captured in response to moderator posing a survey question, wherein the image comprises images of one or more members of the audience raising their hands 204a and 204b.

Figure 2B:
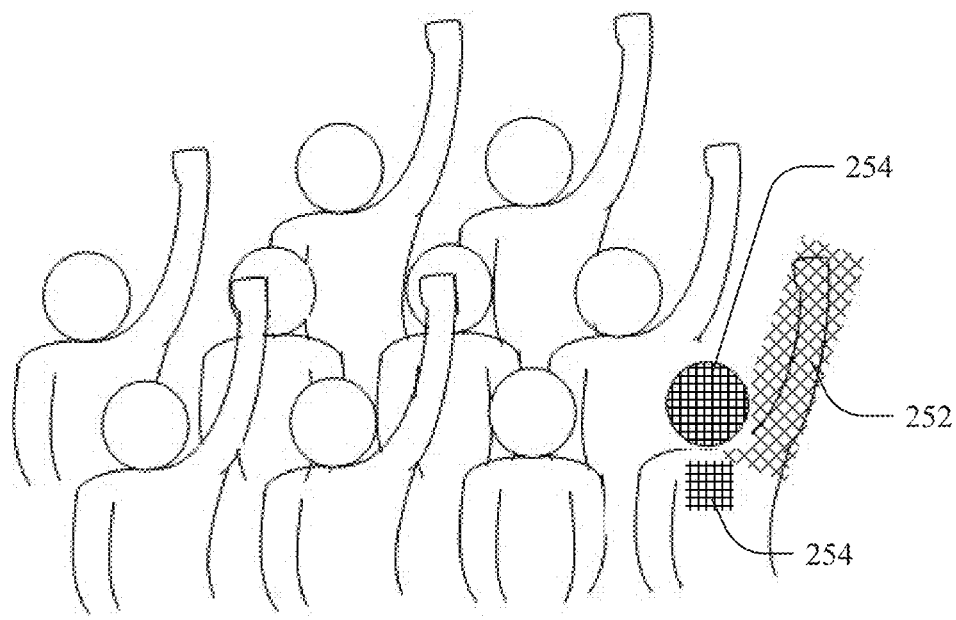
FIG. 2B illustrates an example, non-limiting an image captured from moderator's view point in accordance with one or more embodiments described herein.

FIG. 2B illustrates an example, non-limiting an image 200 captured from moderator's view point in accordance with one or more embodiments described herein. Repetitive description of like elements employed in respective embodiments is omitted for sake of brevity. According to some embodiments, a raised hand pattern 252 (e.g., also referred to as "a survey image") can be used to identify number of times a similar image is matched in the image 200. Once the raised hand pattern 252 is matched, additional areas 254 surrounding the raised hand pattern 252 can be processed to identify secondary image information (e.g., associated characteristics such as facial features, clothing, or jewelry). It is not critical which image processing technique is employed to identify a raised hand or secondary image information, as long as, all raised hands and associated characteristics are captured.

Figure 3:
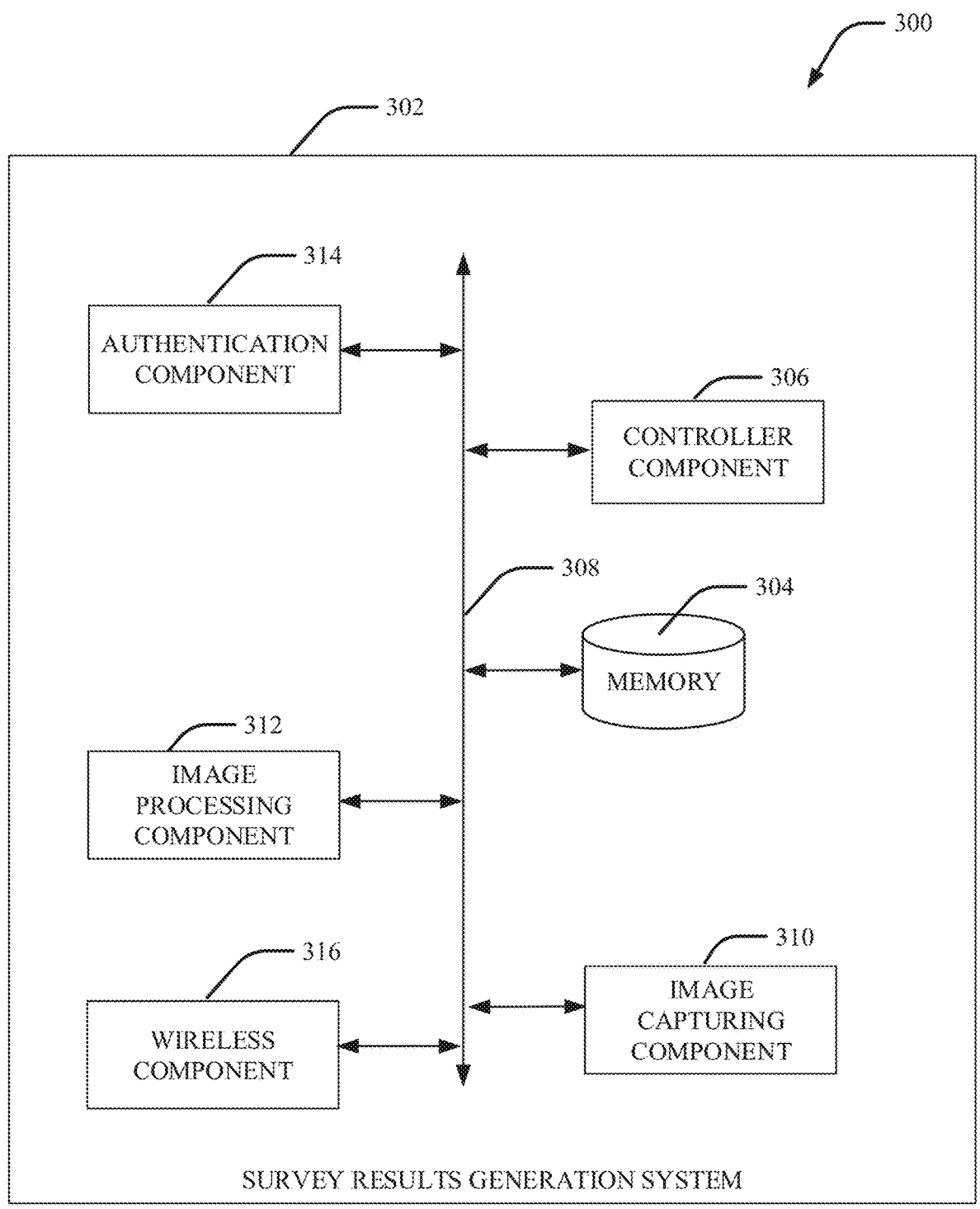
FIG. 3 illustrates a block diagram of an example, non-limiting system that facilitates operation of automated survey results generation system in accordance with one or more embodiments described herein.

FIG. 3 illustrates a block diagram of an example, non-limiting system 300 that facilitates operation of automated survey results generation system in accordance with one or more embodiments described herein. Repetitive description of like elements employed in respective embodiments is omitted for sake of brevity. According to some embodiments, the system 300 can comprise a mobile device (not shown) having survey results generation system 302. In some embodiments, the survey results generation system 302 can also include or otherwise be associated with a memory 304, a controller component 306 (also referred to as a "processor") that executes computer executable components stored in a memory 304. The survey results generation system 302 can further include a system bus 308 that can couple various components including, but not limited to, an image capturing component 310, an image processing component 312, an authentication component 314, and a wireless component 316.

Aspects of systems (e.g., the survey results generation system 302 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

It should be appreciated that the embodiments of the subject disclosure depicted in various figures disclosed herein are for illustration only, and as such, the architecture of such embodiments are not limited to the systems, devices, and/or components depicted therein. For example, in some embodiments, the survey results generation system 302 can comprise various computer and/or computing-based elements described herein with reference to operating environment 900 and FIG. 9. In several embodiments, such computer and/or computing-based elements can be used in connection with implementing one or more of the systems, devices, and/or components shown and described in connection with FIG. 3 or other figures disclosed herein.

According to several embodiments, the memory 304 can store one or more computer and/or machine readable, writable, and/or executable components and/or instructions that, when executed by controller component 306, can facilitate performance of operations defined by the executable component(s) and/or instruction(s). For example, the memory 304 can store computer and/or machine readable, writable, and/or executable components and/or instructions that, when executed by the controller component 306, can facilitate execution of the various functions described herein relating to the image capturing component 310, the image processing component 312, the authentication component 314, and the wireless component 316.

In several embodiments, the memory 304 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 304 are described below with reference to system memory 916 and FIG. 9. Such examples of memory 304 can be employed to implement any embodiments of the subject disclosure.

According to some embodiments, the controller component 306 can comprise one or more types of processors and/or electronic circuitry that can implement one or more computer and/or machine readable, writable, and/or executable components and/or instructions that can be stored on the memory 304. For example, the controller component 306 can perform various operations that can be specified by such computer and/or machine readable, writable, and/or executable components and/or instructions including, but not limited to, logic, control, input/output (I/O), arithmetic, and/or the like. In some embodiments, controller component 306 can comprise one or more central processing unit, multi-core processor, microprocessor, dual microprocessors, microcontroller, System on a Chip (SOC), array processor, vector processor, and/or another type of processor.

In some embodiments, the components of survey results generation system 302, for example, the controller component 306, the memory 304, the image capturing component 310, the image processing component 312, the authentication component 314, and/or the wireless component 316 can be communicatively, electrically, and/or operatively coupled to one another via the system bus 308 to perform functions of the survey results generation system 302, and/or any components coupled therewith. In several embodiments, the system bus 308 can comprise one or more memory bus, memory controller, peripheral bus, external bus, local bus, and/or another type of bus that can employ various bus architectures. Further examples of the system bus 308 are described below with reference to a system bus 918 and FIG. 9. Such examples of system bus 308 can be employed to implement any embodiments of the subject disclosure.

In several embodiments, the survey results generation system 302 can comprise one or more computer and/or machine readable, writable, and/or executable components and/or instructions that, when executed by the controller component 306, can facilitate performance of operations defined by such component(s) and/or instruction(s). Further, in numerous embodiments, any component associated with the survey results generation system 302, as described herein with or without reference to the various figures of the subject disclosure, can comprise one or more computer and/or machine readable, writable, and/or executable components and/or instructions that, when executed by the controller component 306, can facilitate performance of operations defined by such component(s) and/or instruction(s). For example, the authentication component 314, and/or any other components associated with the survey results generation system 302 (e.g., communicatively, electronically, and/or operatively coupled with and/or employed by survey results generation system 302), can comprise such computer and/or machine readable, writable, and/or executable component(s) and/or instruction(s). Consequently, according to numerous embodiments, the survey results generation system 302 and/or any components associated therewith, can employ the controller component 306 to execute such computer and/or machine readable, writable, and/or executable component(s) and/or instruction(s) to facilitate performance of one or more operations described herein with reference to the survey results generation system 302 and/or any such components associated therewith.

In some embodiments, the survey results generation system 302 can facilitate performance of operations related to and/or executed by the components of survey results generation system 302, for example, the controller component 306, the memory 304, the image capturing component 310, the image processing component 312, the authentication component 314, and/or the wireless component 316. For example, as described in detail below, the survey results generation system 302 can facilitate: capturing (e.g., by the image capturing component 310) a first sample image; processing (e.g., by the image processing component 312) the first sample image to determine a survey count by counting how many times a survey image matches in the first sample image; and adjusting (e.g., by authentication component 314) the survey count based on detection of a discrepancy.

In some embodiments, the image capturing component 310 can comprise, but not limited to, one or more digital camera and/or video camera. In an embodiment, one or more digital cameras are configured to capture a single image or multiple images (e.g., video) that are operatively connected to the image capturing component 310. The image capturing component 310 can be wirelessly coupled to one or more digital cameras and/or video recorders. In some embodiments, the image capturing component 310 captures an image (e.g., first sample image) using digital camera and/or video camera of the mobile device or employs external cameras and/or video recorders of other devices operatively coupled to the mobile device.

In some embodiments, the image capturing component 310 captures one or more images upon detecting a request from the user or receiving a request to capture an image from the controller component 306. In some embodiments, the image capturing component 310 captures one or more images upon receiving a request to capture an image from one of the other components of the survey results generation system 302. Upon capturing the one or more images, the images are stored in memory 304 and/or transmitted to the image processing component 312. The size and the quality of the captured image is not critical as long as one or more survey image (e.g., a predefined image that indicates that member in the crowd voted by, for example, raising their hand) can be analyzed.

In some embodiments, the image processing component 312, can comprise one or more processors, memory, and electrical circuitry that is configured to process portion of an image to identify specific image (e.g., a survey image that represents a raised hand). In some embodiments, the image processing component 312 can process one or more of images captured by the image capturing component. In some embodiments, the image processing component 312 processes one of the captured image (e.g., a first sample image provided by the image capturing component 310) to determine a survey count. In some embodiment, the survey count can be determined by counting number of times a survey image (e.g., a raised hand) appears (e.g., matches) the first sample image. For example, using various components of survey results generation system 302, the image processing component 312 process the first sample image. In some embodiments, the image processing component 312 scans the first image to match a pattern associated the sample survey image (e.g., a pattern formation of raised hand). If the pattern match occurs, the image processing component 312 increments the survey count. The image processing component 312 continues until the entire first sample image is processed. The image processing component 312 may employ external servers (not shown) to process the image for faster determination of the survey count. For example, using the wireless component 316, all or portion of the first image can be transmitted to an external server that may employ quantum computers to perform image processing in nano-seconds. In some embodiments, the wireless communication is established prior to or concurrent to actuation of the survey results generation system 302. In addition, a sample survey image (e.g., an image of a raised hand) is provided to the quantum computers prior to actuation of the survey results generation system 302.

In some embodiments, the image processing component 312 can identify a one or more secondary image information, for example, not limited to, facial feature, shape and/or size of the hands, skin tones, body type, or other items associated with the image. For example, once a raised hand is identified, the image is further analyzed the image to identify the facial feature connected to the hand (e.g., area adjacent to portion that matches the raised hand pattern is further analyzed to find additional characteristics). In another example, a jewelry item or piece of clothing associated with the raised hand is captured. In some embodiments, for each raised hand, the system also identifies a facial data, clothing data and/or jewelry data and maintains the one or more secondary image information in memory 304 for authentication of the survey count. The secondary image information can be used if a second level processing is required (discussed below).

In some embodiments, each time a raised hand (e.g., survey image) is identified, the survey count is in incremented. In addition, for each survey image is identified, secondary image information associated with the survey image can be stored in memory 304. Upon processing the entire captured image, the survey count, the survey image and one or more characteristics associated with the survey image are stored in memory 304 (e.g., in a table format) and retrievable by the authentication component 314. For example, a table entry (e.g., "0001") is created for each survey image identified in the image. The image processing component 312 further analyzes the survey image and surrounding areas to identify secondary image information and stores the secondary image information in the table (e.g., "0001.secondary_image_information"). The advantage is capturing additional information is that the additional information can assist in improving accuracy.

In some embodiments, the image processing component 312, employing the wireless component 316 to perform image processing using artificial intelligence techniques and quantum computers for fast processing of the image. In some embodiments, the processing of the captured image may be performed using deep learning and/or neural networks that can be local or reside on external computers (e.g., dedicated servers). In some embodiments, the connection to the servers can be established a-priori.

In some embodiments, the authentication component 314, can comprise one or more processors, memory, and electrical circuitry. In some embodiments, the authentication component can adjust the survey count based on detection of a discrepancy. In some embodiments, the authentication component 314 is employed to improve accuracy of the survey count. For example, when a discrepancy is detected (described below), the authentication component 314 can cause the image processing component 312 to conduct a second level of processing, wherein second level of processing comprises processing additional sample images. The additional images can be set of images captured by one or more external devices that provide perspective from different angles. The second level of processing can identify, for example, raised hands that where blocked or obstructed by other raised hands or objects. The second processing can also identify where someone may have erroneously voted by keeping their hand up for two separate survey questions or raised both hands for same survey question.

In some embodiments, the discrepancy can be identified when survey count indicates an anomaly in counting. An anomaly in counting occurs when a survey seeking a vote of two or more mutually exclusive questions, receives a voting of greater than 100%. For example, for survey question A, the survey count was 59% and for survey question B, the survey count was 49%. In such a scenario, the authentication component 314 can request the image processing component 312 to perform a second level of processing. In some embodiments, the second level of processing comprises of processing additional images captured in response to question A to identify missing votes (e.g., raised hands that may be blocked by other members of the audience or not raised high enough to be captured in the first sample image). In some embodiments, the second level of processing comprises cycling through all the images and for each image generating a survey count using similar technique as discussed above. If the system identifies that survey count differs from first sample image survey count, the higher survey count may be used for generating a report. In some embodiments, the authentication component 314 can request the image processing component 312 to perform the second level of processing of additional images capture in response to question B to eliminate false voting (e.g., voter kept their hand raised for question B).

In some embodiments, the second level of processing can comprise cycling through all the images associated with a second (e.g., question B) or subsequent survey questions of the series of mutually exclusive questions to eliminate false counts. The system can process images to identify if a raised hand identified in the first sample image is also in second or subsequent images. In some embodiments, the system can utilize the additional characteristics (e.g., clothing, skin tone and/or marking, jewelry items) to determine if double voting occurred. The survey results generation system 302 can compare images taken from the same angle or utilize images taken from different angles to identify double counting.

In some embodiments, the second level processing is performed only if the adjustment would impact the outcome. For example, where the survey count anomaly is greater than 20% (or any percent where the adjustment to survey count would not impact the outcome), the authentication component 314 will not initiate performance of the second level processing. For instance, where the moderator asks, an audience of 100 attendees, which topic they would like to discuss (e.g., raise your hands to discuss topic "A" followed by raise your hands to discuss topic "B") and in response survey count was 70% for topic "A" and 40% for topic "B." In this survey, the anomaly is high enough (e.g., margin of error is 30) that any adjustment (e.g., identifying missing votes or eliminating false votes) would not change the outcome and thus the authentication component 314 would ignore the anomaly and recommend topic A. In some examples, where the survey count anomaly is below a threshold (e.g., less than 10% or any percent where the adjustment to survey count would impact the outcome), the authentication component 314 will initiate performance of the second level processing. For instance, where the moderator asks, an audience of 100 attendees, which topic they would like to discuss (e.g., raise your hands to discuss topic "A" followed by raise your hands to discuss topic "B") and in response survey count was 55% for topic "A" and 60% for topic "B." In this survey, the anomaly is low enough that any adjustment (e.g., identifying missing votes or eliminating false votes) could change the outcome. In some embodiments, the authentication component 314 initiates the second level processing to either increase the percentage of topic "A" by identifying missing votes or decrease percentage of topic "B" by eliminating false votes.

In some embodiments, a discrepancy can be triggered when survey count for a question varies from processing multiple images. For example, when survey count generated from two images captured for the same question differ, a discrepancy is triggered (e.g., survey count differs due a raised hand blocked another). In some embodiments, the authentication component 314 can adjust the survey count by selecting the higher survey count or add to survey count if missing votes are found through second level processing.

In some embodiments, the survey results generation system 302 can comprise the wireless component 316 to transmit and/or receive one or more images to and from an external or secondary device. For example, once the image processing component 312 determines that additional images are needed to refine the survey count, the image processing component 312 employs the wireless component 316 to retrieve additional images captured by one or more external cameras or video recorders operatively coupled to the wireless component 316.

In some embodiments, the wireless component 316 can be wireless processor that can interface with one or more sensor devices and the controller component 306. According to some embodiments, the wireless component 316 can include one or more wireless networks, including, but not limited to, a cellular network, a wide area network (WAN) (e.g., the Internet access through wireless technology) or a local area network (LAN). For example, wireless component 316 can comprise wireless technology including, but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 3 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In some embodiments, the wireless component 316 can comprise a transmitter and a receiver for infrared, near-field communication-NFC, Bluetooth, or any suitable wireless communication protocol.

Figure 4:
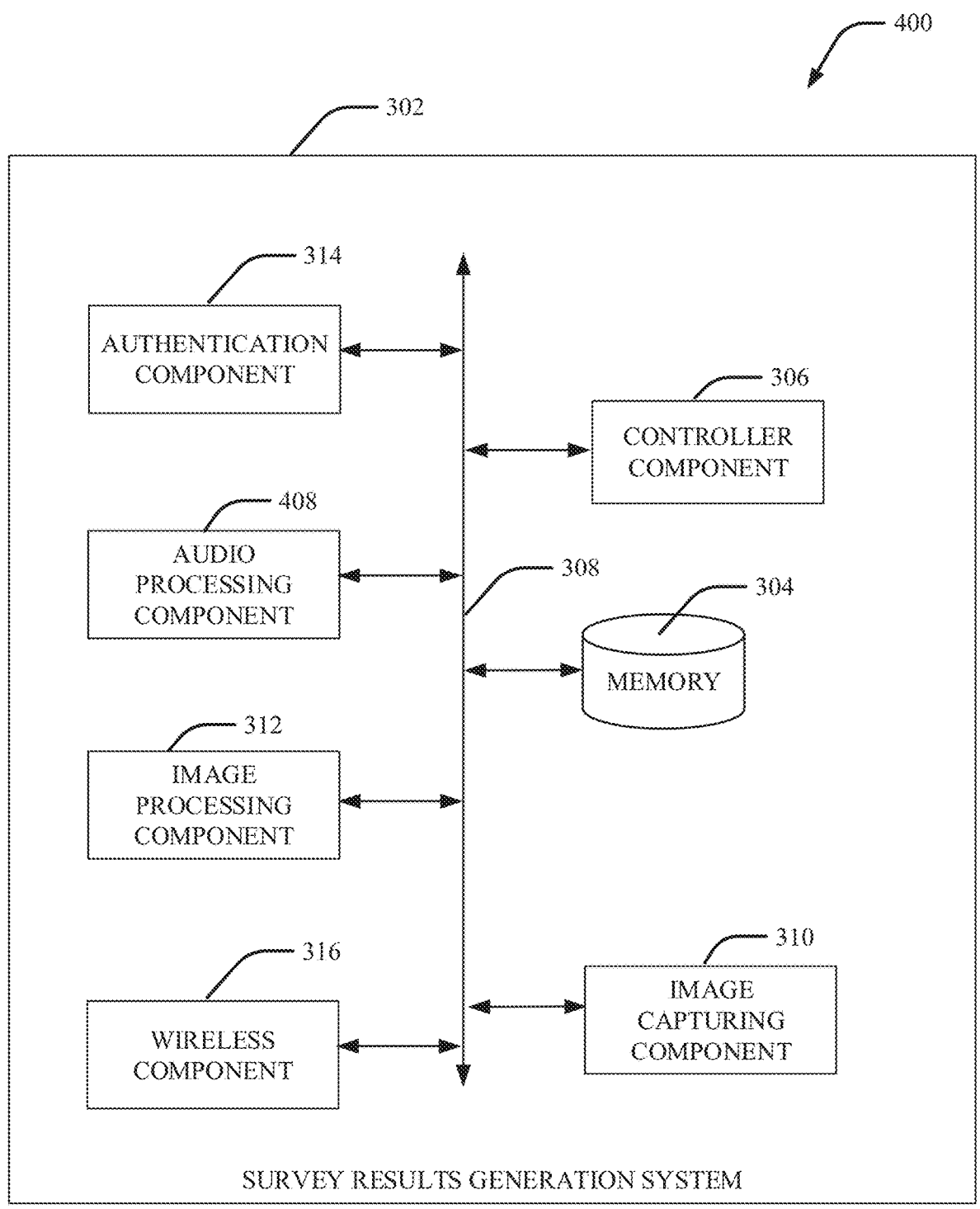
FIG. 4 illustrates a block diagram of an example, non-limiting system that facilitates of the survey results generation system components in accordance with one or more embodiments described herein.

FIG. 4 illustrates a block diagram of an example, non-limiting system 400 that facilitates of the survey results generation system 302 components in accordance with one or more embodiments described herein. Repetitive description of like elements employed in respective embodiments is omitted for sake of brevity. According to several embodiments, the system 400 can comprise survey results generation system 302. In some embodiments, survey results generation system 302 can further comprise an audio processing component 406.

In several embodiments, the audio processing component 406 can comprise a microphone, voice processing module, and/or voice recognition system. In some embodiments, the audio processing component 406 can receives one or more phrases to determine if the one or more phrase matches a survey phrase. In some embodiments, the moderator can record and store one or more survey phrase in the memory 304. The audio processing component 406 can monitor phrase received from the moderator to determine if the phrase matches one or more survey phrases stored memory. In response to detecting one or the survey phrase, the audio processing component 406 transmits a request to the controller component 306 to initiate survey generation by capturing one or more images of the audience and process image for survey counting. The advantage is that the moderator is not required to manually initiate the survey results generation system 302.

Figure 5:
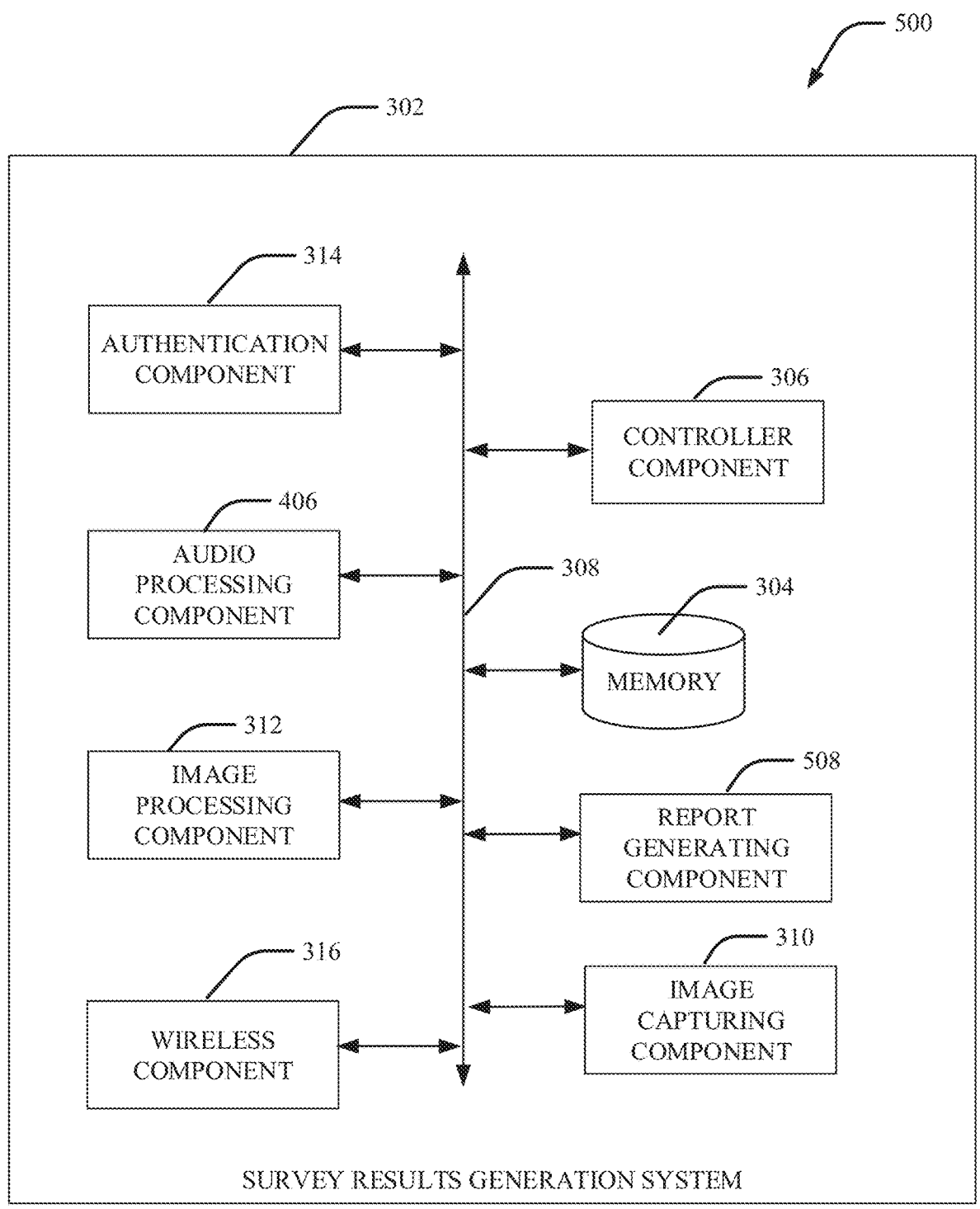
FIG. 5 illustrates a block diagram of an example, non-limiting system that facilitates of the survey results generation system components in accordance with one or more embodiments described herein.

FIG. 5 illustrates a block diagram of an example, non-limiting system 500 that facilitates of the survey results generation system 302 components in accordance with one or more embodiments described herein. Repetitive description of like elements employed in respective embodiments is omitted for sake of brevity. According to several embodiments, the system 500 can comprise survey results generation system 302. In some embodiments, survey results generation system 302 can further comprise a report generating component 508.

In several embodiments, the report generating component 508 can comprise a display and/or one or more electronic devices to display a report. In some embodiments, the report generating component 508 can generates a report that is an association between the survey count and the survey phrase. In some embodiments, the authentication component 314 provides the survey count to the report generating component 508 upon making all adjustments, if any. The report generating component 508 can display one or more survey phrase and associated survey count on the local display (e.g., moderator's mobile device that initiated the survey generations system 302) and/or employing the wireless component 316 to display on one or more external displays.

Figure 6:
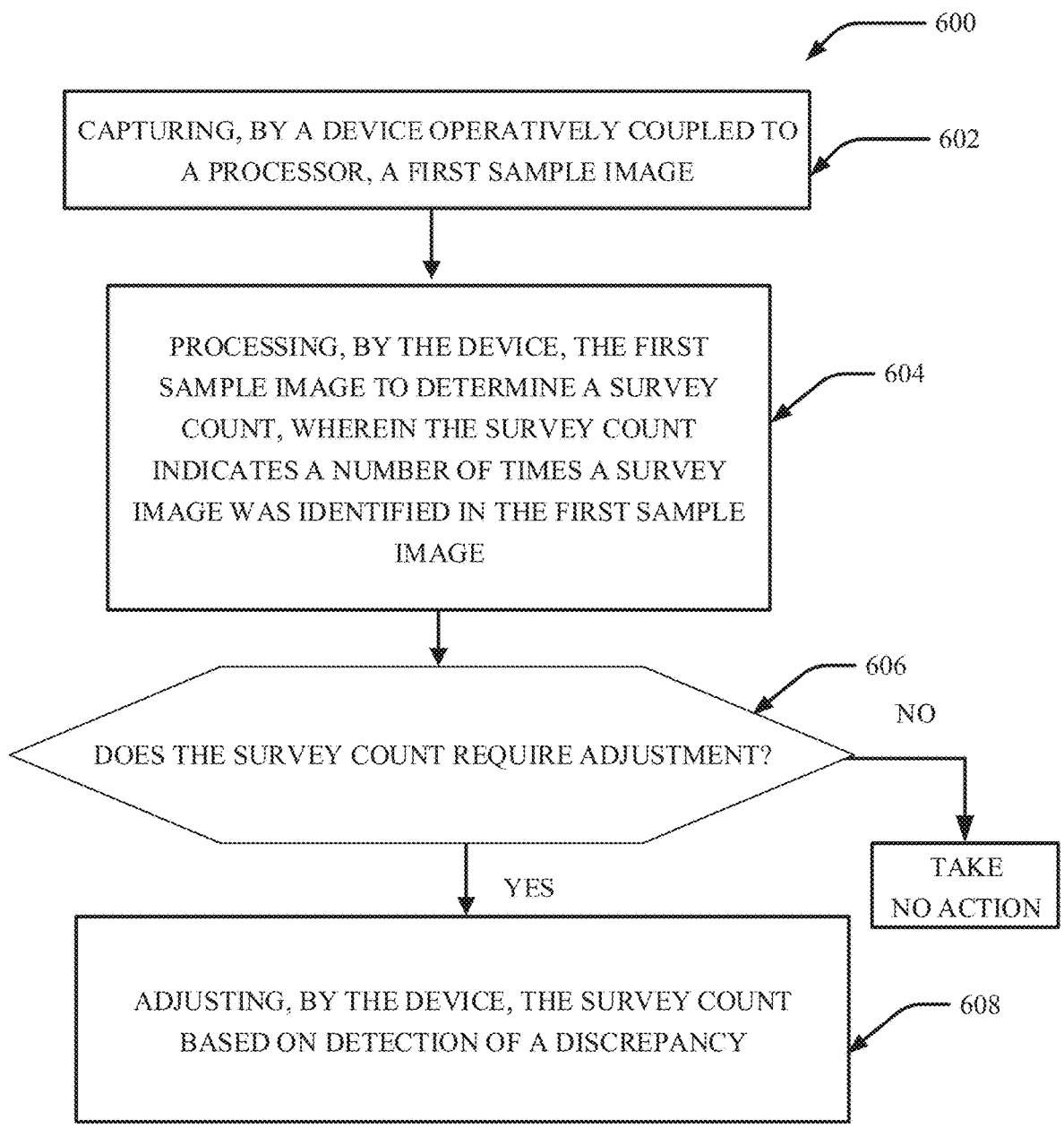
FIG. 6 depicts a diagram of an example, non-limiting computer implemented method that facilitates using the survey results generation system accordance with one or more embodiments describe herein.

FIG. 6 depicts a diagram of an example, non-limiting computer implemented method that facilitates using the survey results generation system 302 accordance with one or more embodiments describe herein. Repetitive description of like elements employed in other embodiments described herein is omitted for sake of brevity. In some examples, flow diagram 600 can be implemented by operating environment 900 described below. It can be appreciated that the operations of flow diagram 600 can be implemented in a different order than is depicted.

In non-limiting example embodiments, a computing device (or system) (e.g., computer 912) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 depicts capturing, by a device operatively coupled to a processor (e.g., the image capturing component 310), a first sample image. Operation 604 depicts processing, by the device (e.g., the image processing component 312), the first sample image to determine a survey count, wherein the survey count indicates a number of times a survey image was identified in the first sample image. Operation 606 depicts determining if the survey count require any adjustment. If the survey count does require adjustment, then perform operation 608. Otherwise, continue monitoring. Operation 608 depicts adjusting, by the device (e.g., the authentication component 314), the survey count based on detection of a discrepancy.

Figure 7:
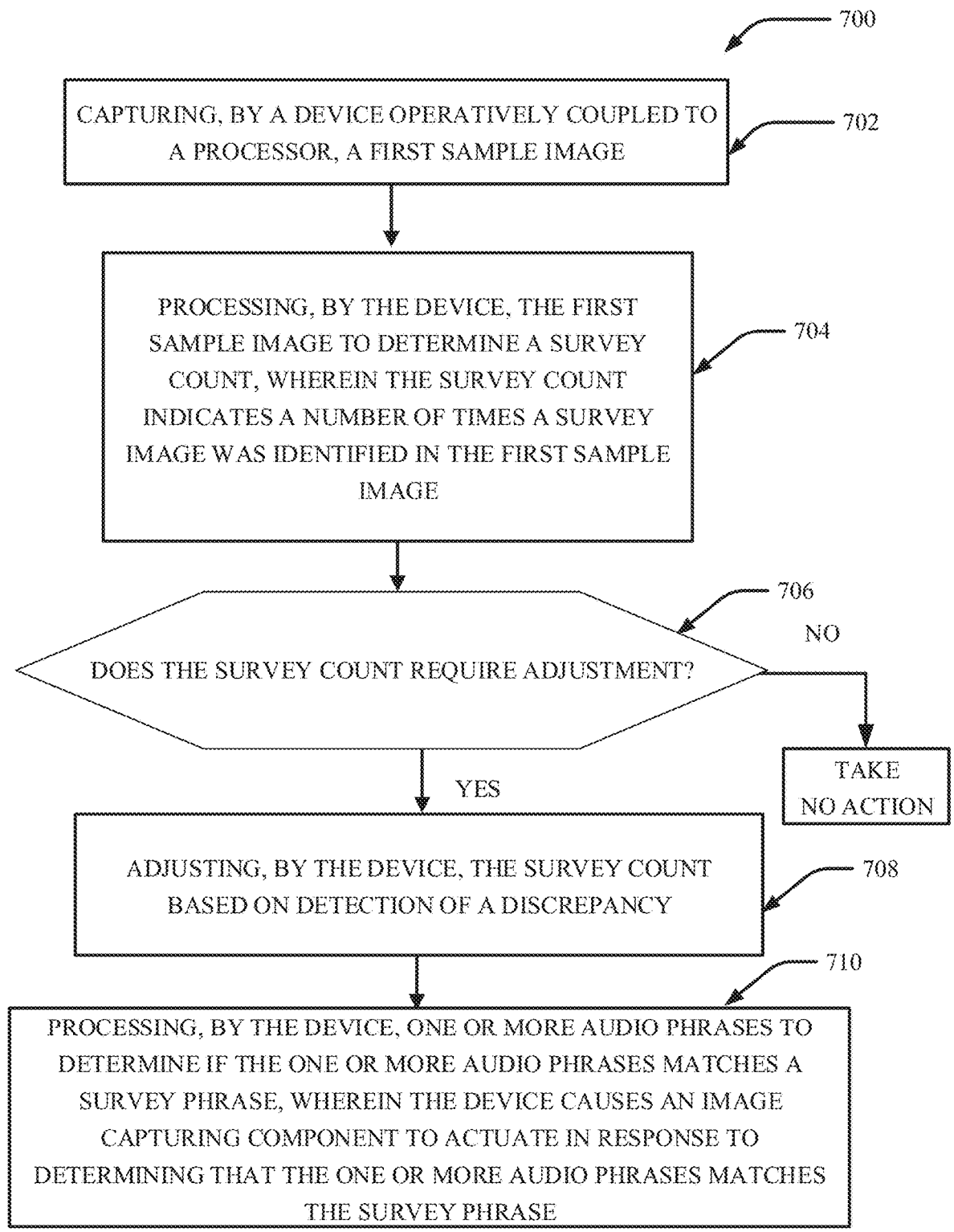
FIG. 7 depicts a diagram of an example, non-limiting computer implemented method that facilitates using the survey results generation system accordance with one or more embodiments describe herein.

FIG. 7 depicts a diagram of an example, non-limiting computer implemented method that facilitates using the survey results generation system 302 accordance with one or more embodiments describe herein. Repetitive description of like elements employed in other embodiments described herein is omitted for sake of brevity. In some examples, flow diagram 700 can be implemented by operating environment 900 described below. It can be appreciated that the operations of flow diagram 700 can be implemented in a different order than is depicted.

In non-limiting example embodiments, a computing device (or system) (e.g., computer 912) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts capturing, by a device operatively coupled to a processor (e.g., the image capturing component 310), a first sample image. Operation 704 depicts processing, by the device (e.g., the image processing component 312), the first sample image to determine a survey count, wherein the survey count indicates a number of times a survey image was identified in the first sample image. Operation 706 depicts determining if the survey count require any adjustment. If the survey count does require adjustment, then perform operation 708. Otherwise, continue monitoring. Operation 708 depicts adjusting, by the device (e.g., the authentication component 314), the survey count based on detection of a discrepancy. Operation 710 depicts processing, by the device (e.g., the audio processing component 408), one or more audio phrases to determine if the one or more audio phrases matches a survey phrase, wherein the device causes the image capturing component 310 to actuate in response to determining that the one or more audio phrases matches the survey phrase.

Figure 8:
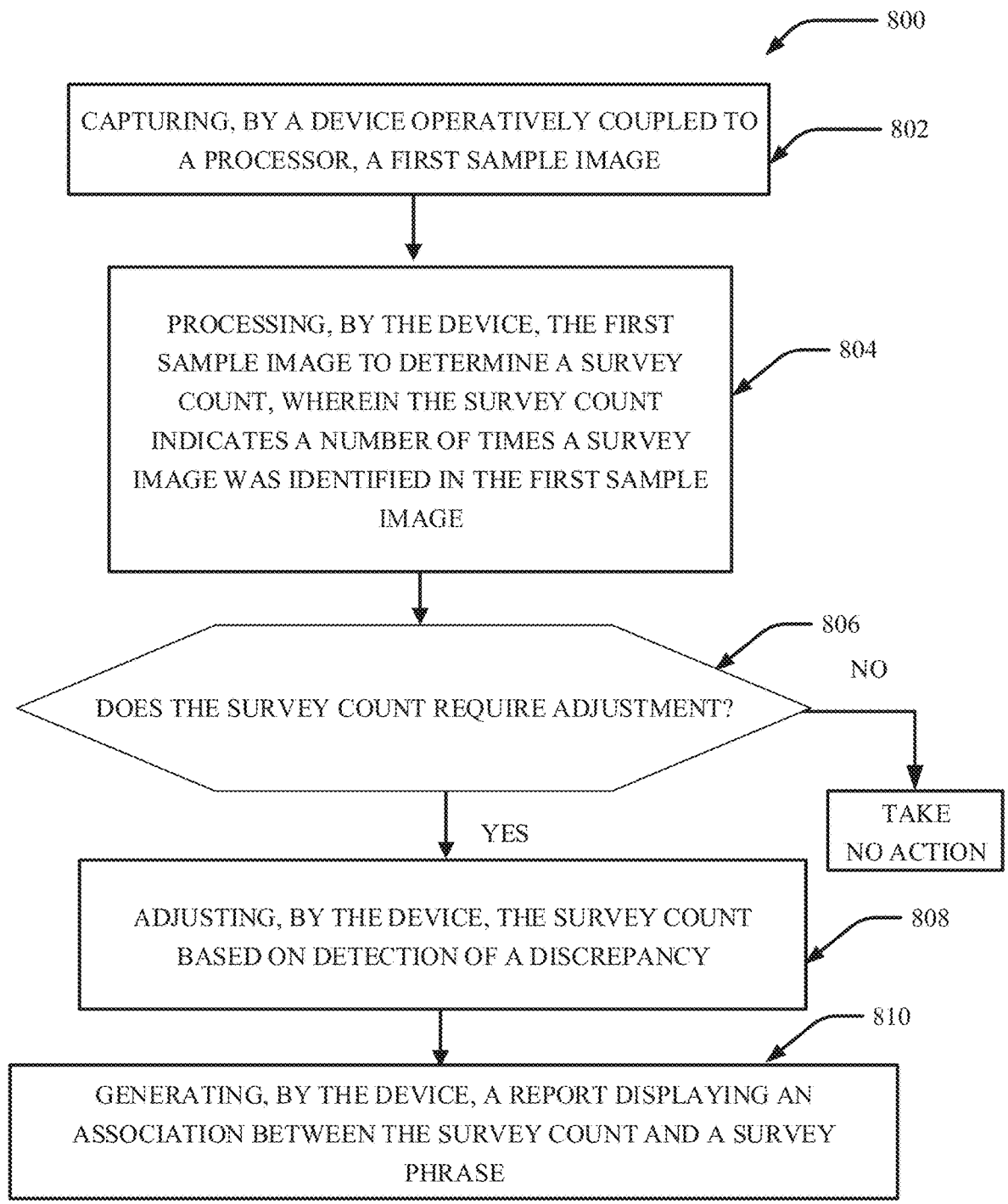
FIG. 8 depicts a diagram of an example, non-limiting computer implemented method that facilitates using the survey results generation system accordance with one or more embodiments describe herein.

FIG. 8 depicts a diagram of an example, non-limiting computer implemented method that facilitates using the survey results generation system 302 accordance with one or more embodiments describe herein. Repetitive description of like elements employed in other embodiments described herein is omitted for sake of brevity. In some examples, flow diagram 800 can be implemented by operating environment 900 described below. It can be appreciated that the operations of flow diagram 800 can be implemented in a different order than is depicted.

In non-limiting example embodiments, a computing device (or system) (e.g., computer 912) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts capturing, by a device operatively coupled to a processor (e.g., the image capturing component 310), a first sample image. Operation 804 depicts processing, by the device (e.g., the image processing component 312), the first sample image to determine a survey count, wherein the survey count indicates a number of times a survey image was identified in the first sample image. Operation 806 depicts determining if the survey count require any adjustment. If the survey count does require adjustment, then perform operation 808. Otherwise, continue monitoring. Operation 808 depicts adjusting, by the device (e.g., the authentication component 314), the survey count based on detection of a discrepancy. Operation 810 depicts generating, by the device (e.g., the report generating component 508), a report displaying an association between the survey count and a survey phrase.

Figure 9:
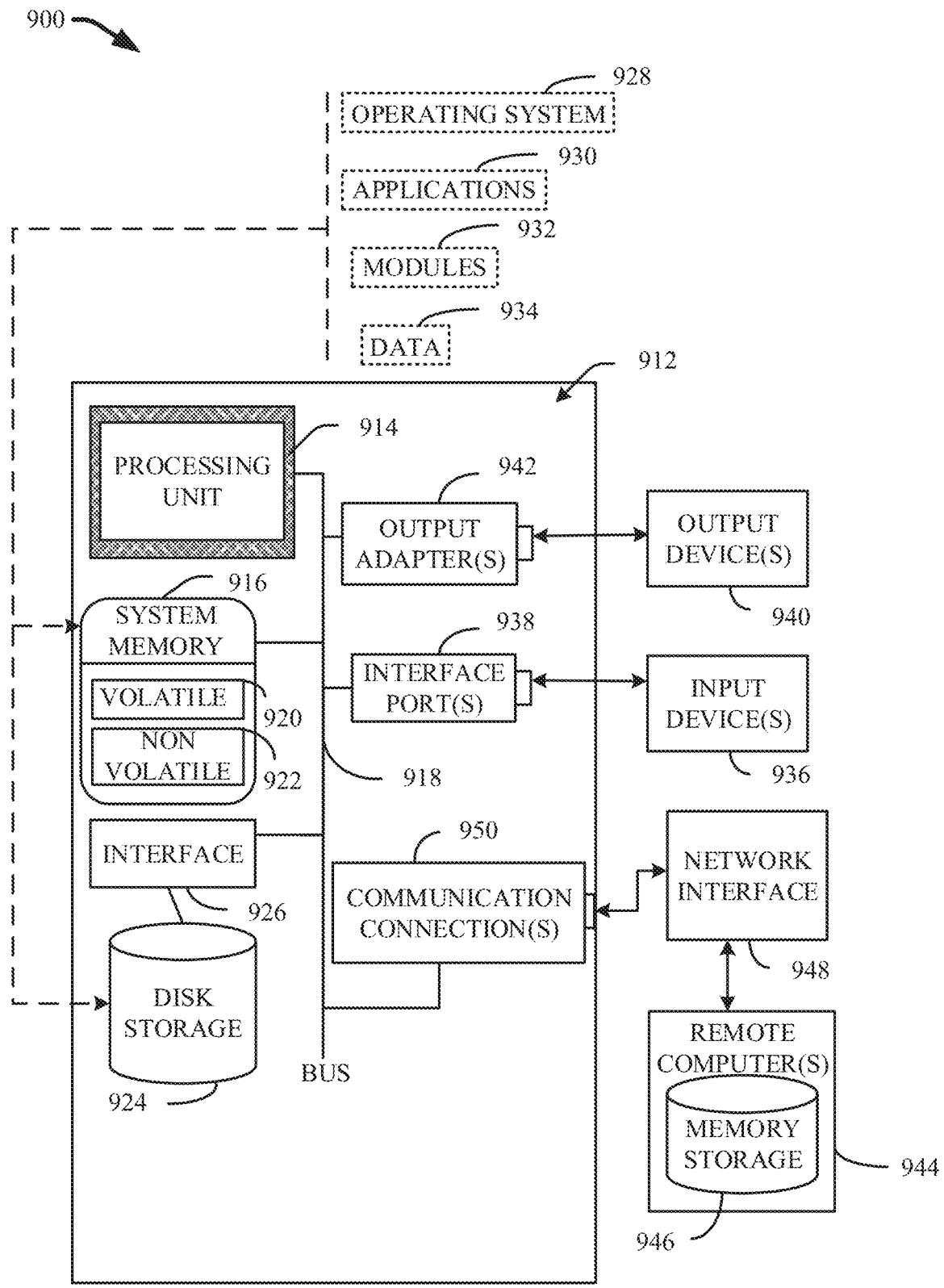
FIG. 9 illustrates a block diagram of an example, non-limiting operating environment in which one or more embodiments described herein can be facilitated.

FIG. 9 illustrates a block diagram of an example, non-limiting operating environment 900 in which one or more embodiments described herein can be facilitated. The operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 994), and Small Computer Systems Interface (SCSI). The system memory 916 can also include volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used, such as interface 926. FIG. 9 also depicts software that acts as an intermediary between users and the basic computer resources described in the suitable operating environment 901. Such software can also include, for example, an operating system 928. Operating system 928, which can be stored on disk storage 924, acts to control and allocate resources of the computer 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor based appliance, a peer device or other common network node and the like, and typically can also include many or all the elements described relative to computer 912. For purposes of brevity, only a memory storage device 946 is illustrated with remote computer(s) 944. Remote computer(s) 944 is logically coupled to computer 912 through a network interface 948 and then physically coupled via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

Embodiments of the present innovation may be a system, a method, an apparatus and/or a computer program product at any possible technical detail level of integration. The computer program product can include a computer readable storage medium (or media) having computer readable program instructions thereon for causing a processor to carry out aspects of the present innovation. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present innovation can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be coupled to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present innovation.

Aspects of the present innovation are described herein with reference to flowchart illustrations and/or block diagrams of methods, apparatus (systems), and computer program products according to embodiments of the innovation. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present innovation. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform tasks and/or implement abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a first camera;
   a memory that stores computer executable components; and
   a processor that executes the computer executable components stored in the memory, wherein the computer executable components comprise:
      an image capturing component that, in response to detecting, via a microphone, an audio phrase that matches a survey phrase, controls the first camera to capture a first image from a first angle of a defined area comprising an audience for a survey vote;
      an image processing component that processes the first image to determine a survey count, wherein the survey count indicates a number of times a survey image was identified in the first image; and
      an authentication component that, based on detection of a discrepancy within the survey count:
         in response to the discrepancy exceeding a threshold:
            performs a secondary level processing of information associated with the survey vote, wherein the first image from the first angle is compared to a second image captured from a second camera from a second angle of the defined area to identify instances of the survey image being obstructed in the first image, wherein the first angle is different from the second angle, and adjusts the survey count based on the secondary level processing of the information; and
         in response to the discrepancy not exceeding the threshold, ignoring the discrepancy.

2. The system of claim 1, wherein the second level processing of information comprises processing the second image from the second angle to identify other instances of the survey image being duplicated by a single person in the audience for the survey vote.

3. The system of claim 1, wherein the information comprises secondary image information from the first image, wherein the secondary image information is not the survey image and is selected from a group consisting of facial data, clothing data, and jewelry data.

4. The system of claim 1, further comprising:
   an audio processing component that processes one or more audio phrases captured by the microphone to determine if the one or more audio phrases comprises the audio phrase that matches the survey phrase.

5. The system of claim 1, further comprising:
   a report generating component that generates a report indicating the survey count associated with the survey phrase.

6. The system of claim 1, wherein the image capturing component, in response to detecting the audio phrase that matches the survey phrase, controls the second camera to capture the second image from the second angle of the defined area; and
   wherein the image processing component processes the second image to determine the survey count by counting how many times the survey image was matched in the first image and the second image.

7. A computer implemented method, comprising:
   in response to detecting via a microphone, an audio phrase that matches a survey phrase, controlling, by a device operatively coupled to a processor, a first camera to capture a first image from a first angle of a defined area comprising an audience for a survey vote;
   processing, by the device, the first image to determine a survey count, wherein the survey count indicates a number of times a survey image was identified in the first image;
   detecting a discrepancy within the survey count;
   determining that the discrepancy exceeds a threshold; and
   in response to the detecting and the determining:
      executing a secondary level processing of information associated with the survey vote, wherein the first image from the first angle is compared to a second image captured from a second camera from a second angle of the defined area to identify instances of the survey image being obstructed in the first image, wherein the first angle is different from the second angle, and
      adjusting the survey count based on the secondary level processing of the information.

8. The computer implemented method of claim 7, wherein the second level processing of information comprises processing the second image to identify other instances of the survey image being duplicated by a single person in the audience for the survey vote.

9. The computer implemented method of claim 7, wherein the information comprises secondary image information from the first image, wherein the secondary image information is not the survey image.

10. The computer implemented method of claim 7, further comprising:
    processing, by the device, one or more audio phrases captured by the microphone to determine if the one or more audio phrases comprises the audio phrase that matches the survey phrase.

11. The computer implemented method of claim 8, further comprising:

generating, by the device, a report displaying an association between the survey count and the survey phrase.

12. The computer implemented method of claim 10, further comprising, in response to the detecting that the audio phrase that matches the survey phrase, controlling, by the device, the second camera to capture the second image from the second angle of the defined area.

13. The computer implemented method of claim 7, wherein the threshold is set at a value where an adjustment of the survey count would impact an outcome of a survey associated with the survey phrase.

14. A computer program product that provides survey information using image processing, the computer program product comprising a computer readable storage medium having program instructions embodied therewith, the program instructions executable by a processor to cause the processor to:
  in response to detecting, via a microphone, an audio phrase that matches a survey phrase, control, by the processor, a first video camera to capture a first image from a first angle of a defined area comprising an audience for a survey vote;
  process, by the processor, the first image to determine a survey count, wherein the survey count comprises a number of times a survey image was identified in the first image; and
  based on detection of a discrepancy within the survey count, perform, by the processor:
    in response to the discrepancy exceeding a threshold:
      executing a secondary level processing of information associated with the survey vote, wherein the first image from the first angle is compared to a second image captured from a second camera from a second angle of the defined area to identify instances of the survey image being obstructed in the first image, wherein the first angle is different from the second angle, and
      adjusting the survey count based on the secondary level processing of the information; and
    in response to the discrepancy not exceeding the threshold, ignoring the discrepancy.

15. The computer program product of claim 14, wherein the second level processing of information comprises processing the second image from the second angle to identify other instances of the survey image being duplicated by a single person in the audience for the survey vote.

16. The computer program product of claim 14, wherein the information comprises secondary image information from the first image, wherein the secondary image information is not the survey image.

17. The computer program product of claim 14, wherein the program instructions are further executable by the processor to cause the processor to:
  further process, by the processor, one or more audio phrases captured by the microphone to determine if the one or more audio phrases comprises the audio phrase that matches the survey phrase.

18. The computer program product of claim 15, wherein the program instructions are further executable by the processor to cause the processor to:
  generate, by the processor, a report displaying an association between the survey count and the survey phrase.

19. The computer program product of claim 14, wherein the program instructions are further executable by the processor to cause the processor to:
  in response to the detecting that the audio phrase that matches the survey phrase, control, by the processor, the second camera to capture the second image from the second angle of the defined area.

20. The computer program product of claim 14, wherein the threshold is set at a value where an adjustment of the survey count would not impact an outcome of a survey associated with the survey phrase.

* * * * *